United States Patent
Nakagawa (10) Patent No.: US 7,637,235 B2
(45) Date of Patent: Dec. 29, 2009

(54) VALVE TIMING CONTROLLER FOR ENGINE

(75) Inventor: Yoshitomi Nakagawa, Shizuoka (JP)

(73) Assignee: Yamaha Hatsudoki Kabushiki Kaisha, Shizuoka-Ken (JP)

( * ) Notice: Subject to any disclaimer, the term of this patent is extended or adjusted under 35 U.S.C. 154(b) by 171 days.

(21) Appl. No.: 11/945,953

(22) Filed: Nov. 27, 2007

(65) Prior Publication Data

US 2008/0125956 A1    May 29, 2008

(30) Foreign Application Priority Data

Nov. 29, 2006    (JP)    ............... 2006-322484

(51) Int. Cl.
    *F01L 1/34* (2006.01)
(52) U.S. Cl. ............... 123/90.17; 123/90.15; 123/90.31
(58) Field of Classification Search ............ 123/90.15, 123/90.31, 90.17
    See application file for complete search history.

(56) References Cited

U.S. PATENT DOCUMENTS

2003/0200943 A1*    10/2003    Wada et al. ............ 123/90.15

FOREIGN PATENT DOCUMENTS

JP    2005-054590    3/2005

* cited by examiner

*Primary Examiner*—Zelalem Eshete
(74) *Attorney, Agent, or Firm*—Hogan & Hartson LLP (57) ABSTRACT

A valve timing controller of an engine reduces degradation of drivability such as a feeling of jumping out of a vehicle and achieves a rapid increase in engine output according to a throttle operation amount. An ECU shifts a phase of a cam shaft toward a control target value A at a reference update speed C1 when it is judged that a rider does not desire an output increase, and shifts the phase of the cam shaft toward the control target value A at a transient update speed C2 higher than the reference update speed C1 when it is judged that the rider desires an output increase.

2 Claims, 12 Drawing Sheets

VALVE TIMING CONTROLLER FOR ENGINE

RELATED APPLICATIONS

This application claims the benefit of priority under 35 USC 119 of Japanese patent application no. 2006-322484, filed on Nov. 29, 2006, which application is hereby incorporated by reference in its entirety.

BACKGROUND OF THE INVENTION

1. Field of the Invention

The present invention relates to a valve timing controller that varies the opening and closing timing of intake and exhaust valves according to an operation condition of an engine.

2. Description of Related Art

An automobile or motorcycle may be equipped with a valve timing controller that varies the opening and closing timing of intake and exhaust valves according to an operation condition of an engine, such as revolution speed (for example, see JP-A-2005-54590).

Figure 11:
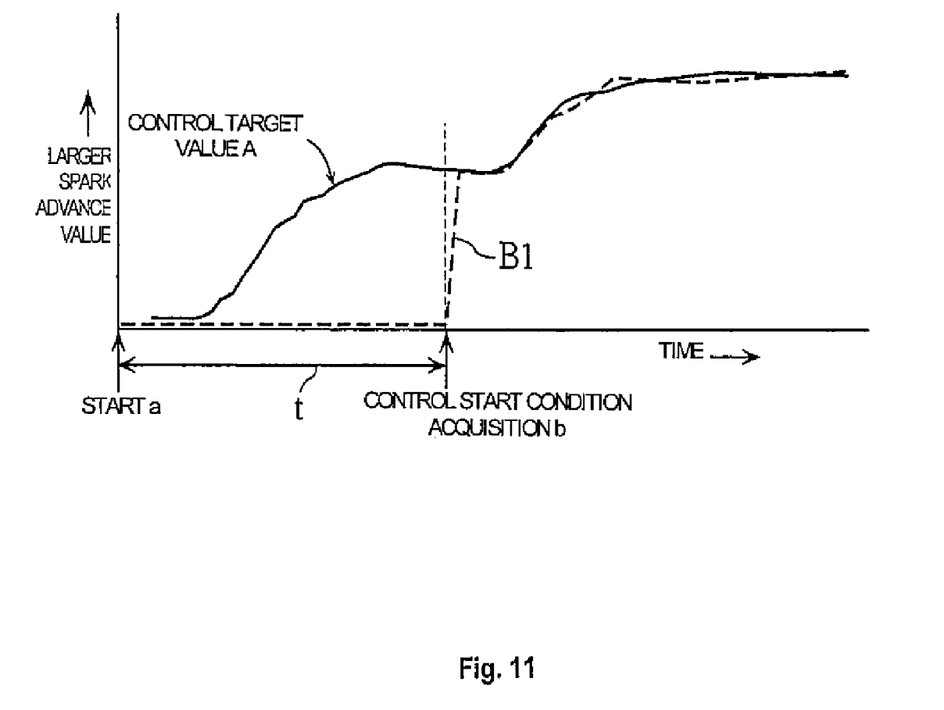
FIG. 11 is a diagram showing characteristics for explaining development process of the invention.

With reference to FIG. 11, the period from an engine start time 'a' to a control start condition acquisition time 'b' corresponds to a stand-by period t for an initialization process. During the stand-by period t, a control target value A varies according to the operation condition of the engine. The difference between control target value A and the actual spark advance value is large at control start condition acquisition time b. When the actual spark advance value is shifted to a value equivalent to target value A in a short time, a spark advance update speed B1 (spark advance amount per unit time) becomes excessively high. Such a rapid increase in engine output may have an adverse effect on drivability such as a feeling of jumping out of the vehicle. This adverse effect is more serious for lightweight and small-sized vehicles such as motorcycles than for larger vehicles such as automobiles.

Figure 12:
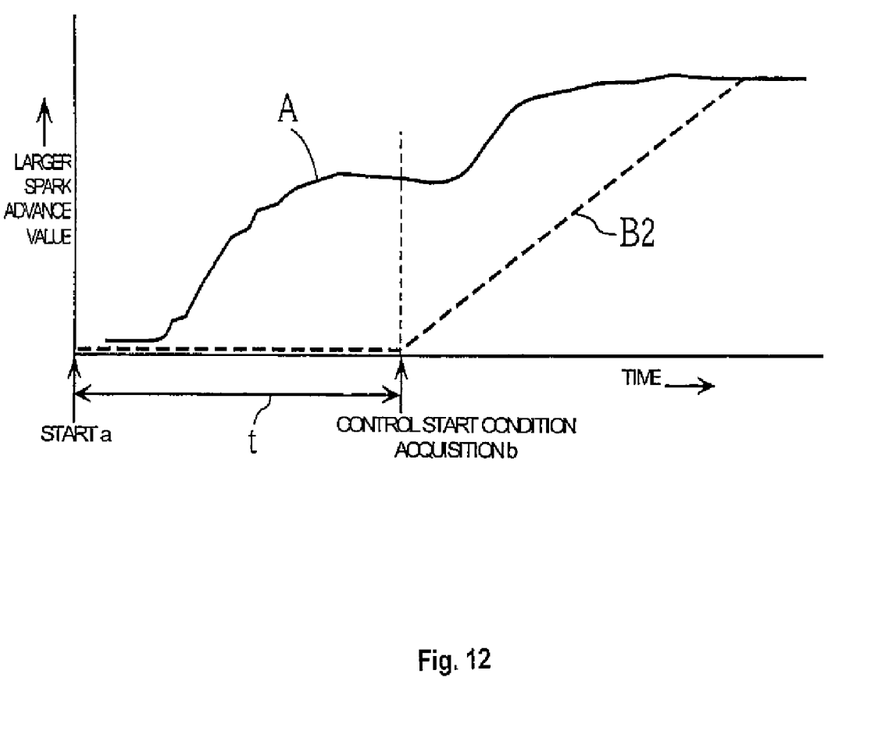
FIG. 12 is a diagram showing characteristics for explaining development process of the invention.

In order to minimize this effect, as shown in FIG. 12, one possible solution is to use a lower spark advance update speed value B2 to reach control target value A after control start condition acquisition time b. However, when a low value is set as the spark advance update speed at the control start condition acquisition time, a longer time is required until the spark advance value becomes the control target value, even when the driver or rider widens the throttle opening after the control start condition acquisition time. Thus, engine output does not sufficiently increase when the driver or rider desires to accelerate the vehicle and a rapid increase in engine output cannot be achieved.

SUMMARY OF THE INVENTION

The invention has been developed to solve these problems and provides a valve timing controller that prevents adverse effects on drivability such as a feeling of jumping out of a vehicle, while still rapidly increasing engine output according to the throttle opening operation.

A valve timing controller of an engine according to the invention includes an intake valve, an exhaust valve, an intake cam shaft that opens and closes the intake valve and an exhaust cam shaft that opens and closes the exhaust valve. A valve timing variable mechanism varies phases of the intake and exhaust cam shafts. A control target value setting unit sets a control target value for the valve timing variable mechanism according to an engine operation condition. A variable mechanism control unit controls the valve timing variable mechanism such that the phases of the intake and exhaust cam shafts shift toward the control target value after a control start condition is acquired. A driver's desire judging means judges whether a rider desires an output increase. The variable mechanism control unit shifts the phases of the cam shafts toward the control target value at a reference update speed when the driver's desire judging means judges that the rider does not desire an output increase, and toward the control target value at a transient update speed higher than the reference update speed when the driver's desire judging means judges that the rider desires an output increase.

According to the valve timing controller of the invention, the phases of the cam shafts are shifted toward the control target value at the reference update speed when the rider does not desire an output increase. Thus, the variation quantity of the spark advance value after acquisition of the control start condition does not become excessively large, and adverse effects on drivability such as a feeling of jumping out of the vehicle are eliminated.

On the other hand, the phases of the cam shafts are shifted toward the control target value at the transient update speed higher than the reference update speed when the rider desires an output increase. In this case, for example, the spark advance value greatly varies when the rider substantially widens the throttle opening. Thus, a rapid increase in engine output corresponding to the desire of the rider is achieved.

Other features and advantages of the invention will be apparent from the following detailed description, taken in conjunction with the accompanying drawings which illustrate, by way of example, various features of embodiments of the invention.

DETAILED DESCRIPTION OF THE INVENTION

A valve timing controller of an engine according to an embodiment of the invention is now described with reference to the appended drawings.

FIGS. 1-10 are views for explaining the valve timing controller of an engine according to the embodiment of the invention. A motorcycle 1 equipped with the valve timing controller includes an engine 3 suspended and supported by a cradle-type body frame 2. A front wheel 5 supported by a head pipe 2a is disposed at a front end of body frame 2 via a front fork 4 to be steerable to the left and right. A rear wheel 7 is supported by a rear arm bracket unit 2b of body frame 2 via a rear arm 6 to swing upward and downward. A straddle-type seat 9 is mounted on body frame 2 above engine 3. Motorcycle 1 also includes an intake duct 8a for supplying air to engine 3, an exhaust pipe 8b connected with engine 3, and a muffler 8c.

Engine 3 is a water-cooled four-stroke V-type four-cylinder engine and includes a crank case 12 containing a crank shaft 11 and a transmission 11b. Crank case 12 is connected to a lower engaging surface 10c of a cylinder block 10 having a V-bank shape formed by a front cylinder 10a and a rear cylinder 10b. Front and rear cylinder heads 13 and 14 are connected to upper engaging surfaces 10d, 10d of front and rear cylinders 10a and 10b. Front and rear head covers 15 and 16 are attached to front and rear cylinder heads 13 and 14. A shift sensor 32 for detecting the shift position of transmission 11b is contained in crank case 12. The front cylinder has substantially the same structure as that of the rear cylinder, and thus only the structure of the front cylinder is chiefly discussed herein.

Cylinder bores 10e, 10e extending in parallel in the vehicle width direction are formed in front and rear cylinders 10a and 10b. A piston 17 is inserted through each cylinder bore 10e and is connected to crank shaft 11 via a connecting rod 18.

Combustion concaves 13b and 14b are formed on lower engaging surfaces 13a and 14a of front and rear cylinder heads 13 and 14. Exhaust ports 13c and 14c and intake ports 13d and 14d are open to combustion concaves 13b and 14b.

An exhaust valve 19 and an intake valve 20 for opening and closing the combustion chamber openings of exhaust ports 13c and 14c and intake ports 13d and 14d are provided in each of front and rear cylinder heads 13 and 14. Cam noses 21a and 22a of exhaust and intake cam shafts 21 and 22 slidingly contact upper ends of exhaust and intake valves 19 and 20 via valve lifters 19a and 20a.

Exhaust and intake cam shafts 21 and 22 are disposed in parallel with crank shaft 11. Intake cam shaft 22 is positioned on the inner side of the V bank, and exhaust cam shaft 21 is positioned on the outer side of the V bank.

A throttle body 23 containing a downstream throttle valve 23a and an upstream throttle valve 23b is connected with each of cylinder head intake ports 13d and 14d. A fuel injection valve 24 is attached to each of throttle bodies 23 to inject fuel toward the combustion openings of intake ports 13d and 14d.

A crank sprocket 11a is provided on crank shaft 11. A cam sprocket 26 is attached to the axial center of intake cam shaft 22 such that cam sprocket 26 can shift its phase with respect to intake cam shaft 22. Cam sprocket 26 is connected with crank sprocket 11a via a timing chain 27.

An intake side timing gear 28 is attached to intake cam shaft 22 such that intake side timing gear 28 can shift its phase with respect to intake cam shaft 22. Intake side timing gear 28 is fixed to and rotates with cam sprocket 26. An exhaust side timing gear 29 engages with intake side timing gear 28. Exhaust side timing gear 29 is fixed to and rotates with exhaust cam shaft 21. By this structure, rotation of crank shaft 11 is transmitted to intake cam shaft 22 via cam sprocket 26 and intake side timing gear 28 using timing chain 27. Rotation of intake cam shaft 22 is then transmitted to exhaust cam shaft 21 via intake and exhaust side timing gears 28 and 29. By rotation of exhaust and intake cam shafts 21 and 22, exhaust valve 19 and intake valve 20 advance and retreat in the axial direction to open and close the combustion openings of exhaust ports 13c and 14c and intake ports 13d and 14d.

Figure 7:
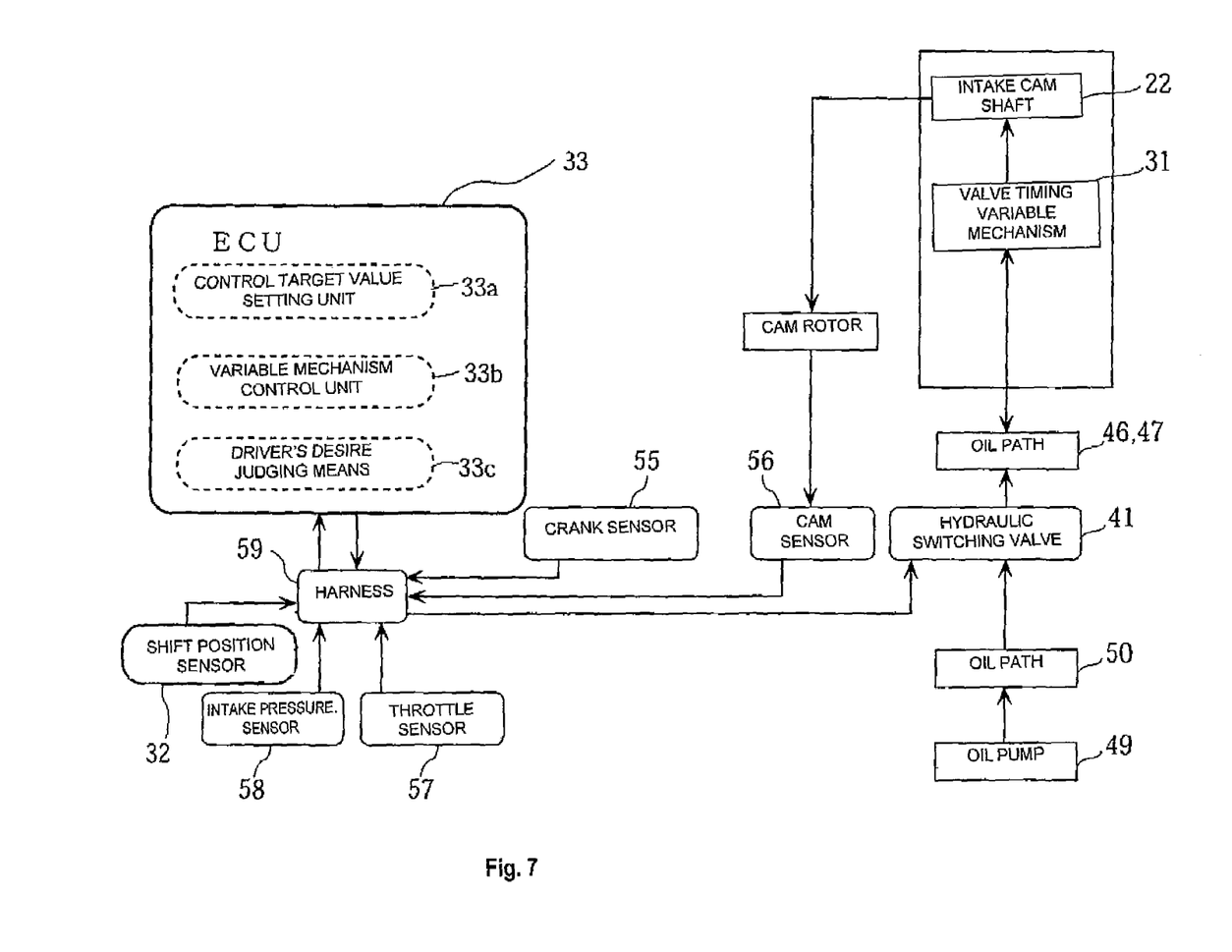
FIG. 7 is a block diagram of the valve timing controller.

Engine 3 has a valve timing controller 30 for varying the opening and closing timing of intake valve 20. Valve timing controller 30 has a valve timing variable mechanism 31 that varies the phase of intake cam shaft 22 with respect to cam sprocket 26 and intake side timing gear 28, and an ECU 33 that controls the operation of valve timing variable mechanism 31. ECU 33 includes a control target value setting unit 33a for setting a control target value A of valve timing variable mechanism 31 according to an engine operation condition, a variable mechanism control unit 33b for controlling valve timing variable mechanism 31 such that the phase of intake cam shaft 22 after control start condition acquisition can shift toward control target value A at a predetermined reference update speed or at a transient update speed, and a driver's desire judging means 33c for judging whether the rider desires to increase the output. Control target value setting unit 33a may be, for example, a map where spark advance quantities are determined based on engine revolution speed, air intake amount, throttle opening and other conditions.

Valve timing variable mechanism 31 includes a boss 22b, having a larger diameter than that of cam shaft 22, formed at the axial center of intake cam shaft 22. An inner circumferential surface of an inner rotor 37 fixedly and oil-tightly engages with an outer circumferential surface of boss 22b. An inner circumferential surface of cam sprocket 26 oil-tightly and slidingly contacts an outer circumferential surface of inner rotor 37 such that cam sprocket 26 can rotate relative to inner rotor 37. Concaves 26a are formed on the inner circumferential surface of cam sprocket 26 at predetermined intervals in the circumferential direction. A boss 26b projecting toward the inside is provided between each adjoining pair of concaves 26a. Inner surfaces of bosses 26b slidingly contact outer circumferential surface 37a of inner rotor 37.

An inner circumferential surface 28a of intake side timing gear 28 oil-tightly and slidingly contacts the outer circumferential surface of boss 22b of intake cam shaft 22 such that intake side timing gear 28 can rotate relative to boss 22b. A cover plate 38 is provided on cam sprocket 26 to cover concaves 26a. Cover plate 38 is fixed to intake side timing gear 28 by a bolt, with cam sprocket 26 interposed between cover plate 38 and intake side timing gear 28.

Figure 1:
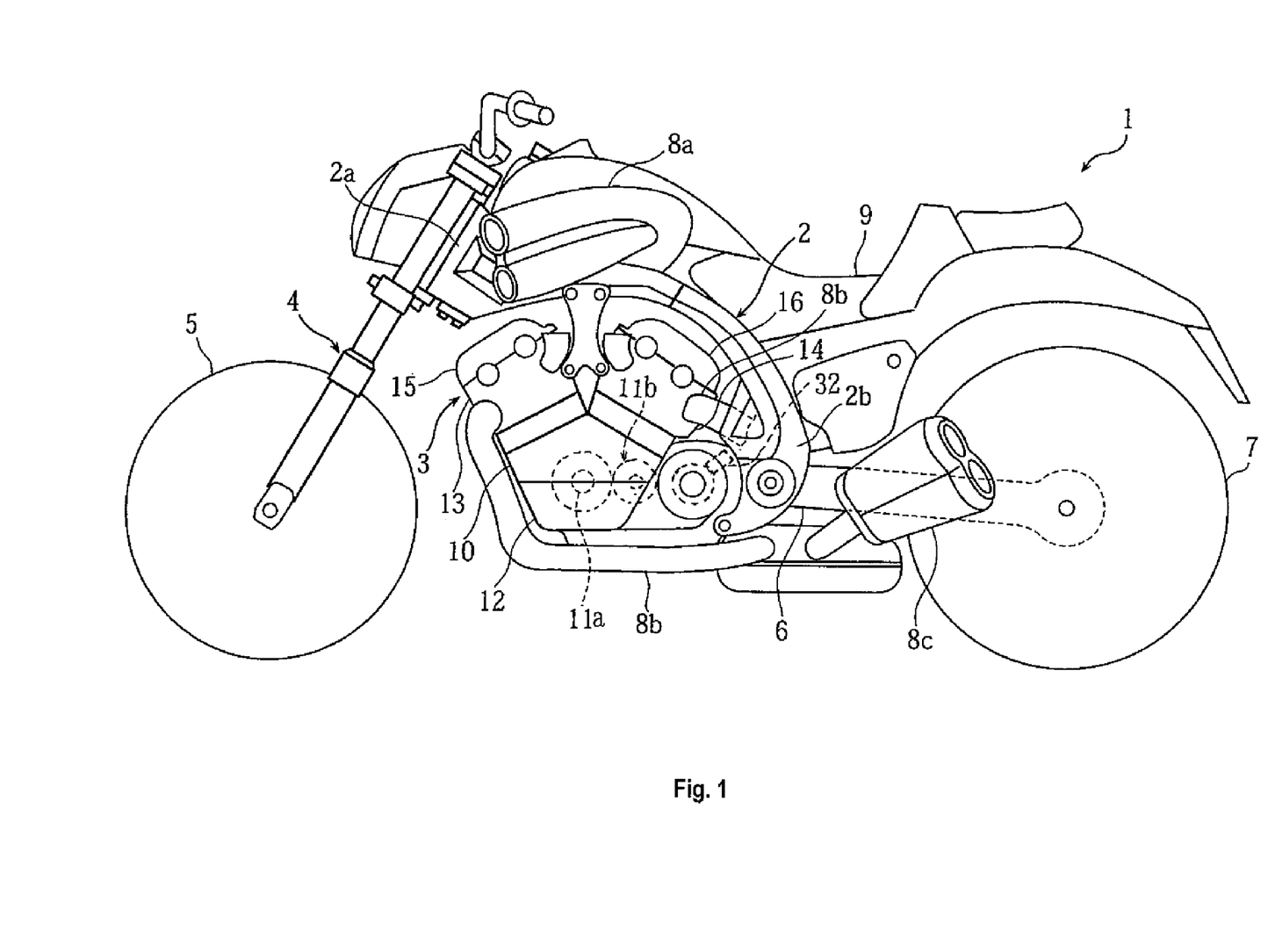
FIG. 1 is a side view of a motorcycle equipped with a valve timing controller of an engine according to an embodiment of the invention.
Figure 2:
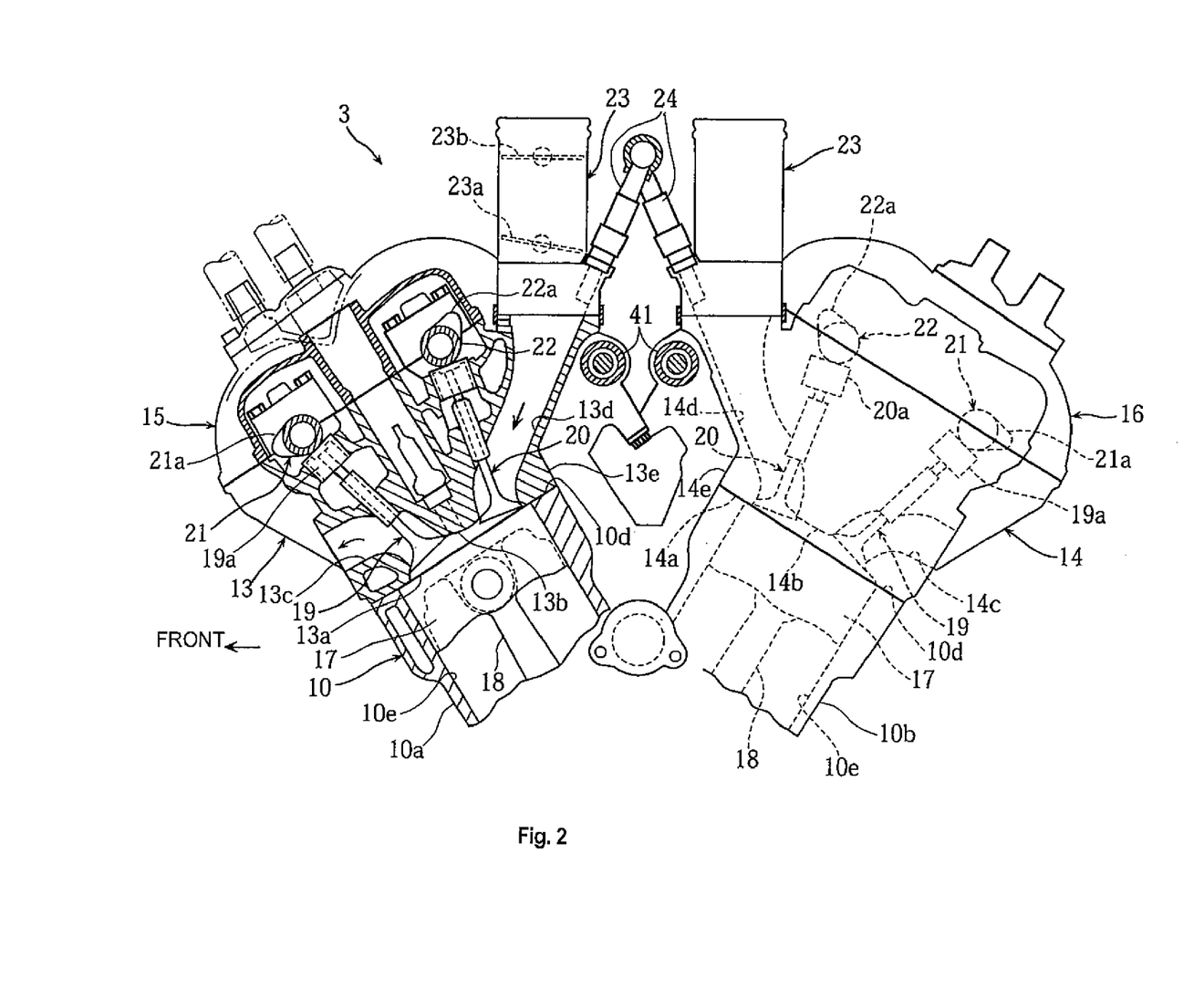
FIG. 2 is a side cross-sectional view of a part of the engine.
Figure 3:
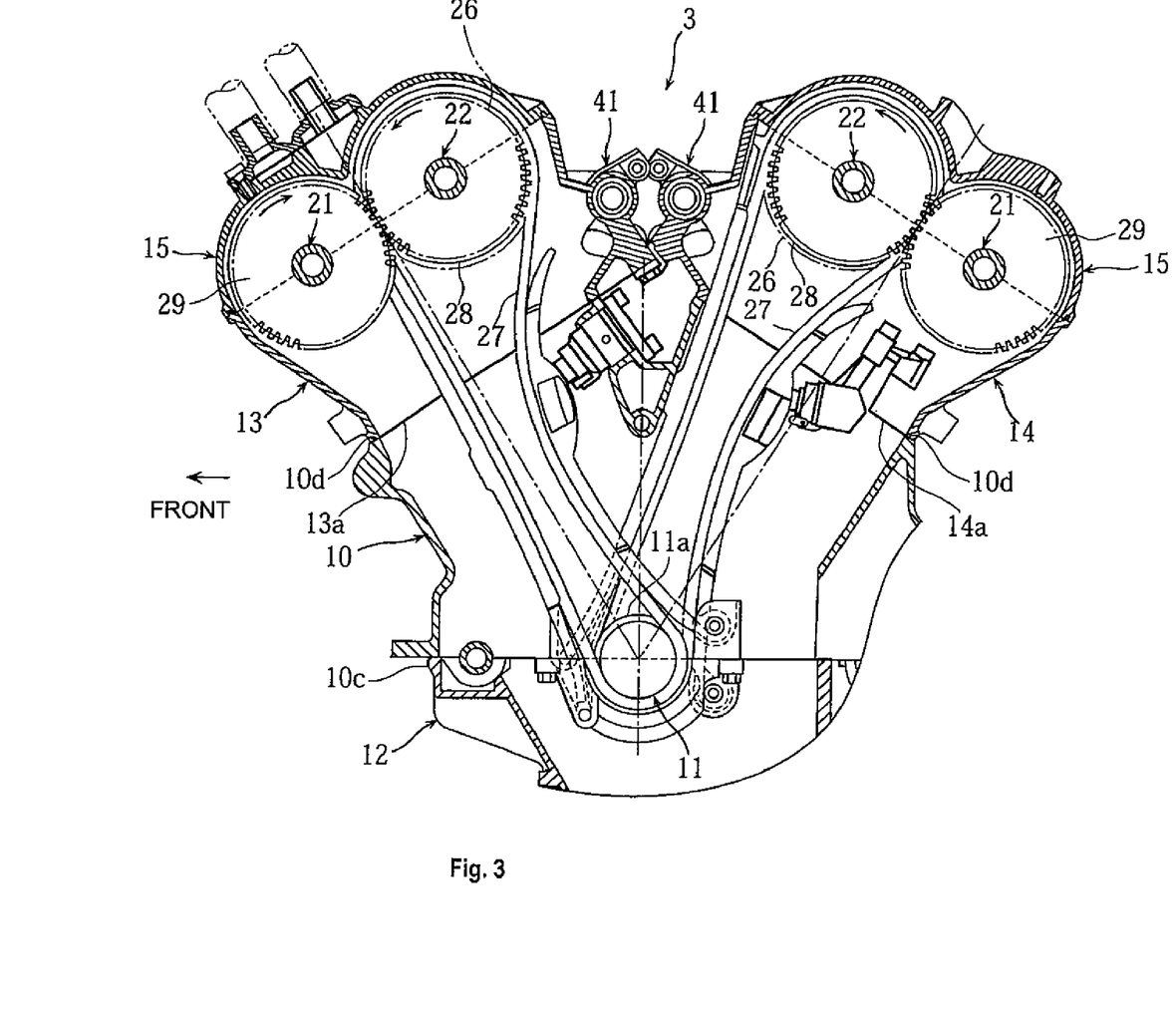
FIG. 3 is a side cross-sectional view of the engine.
Figure 4:
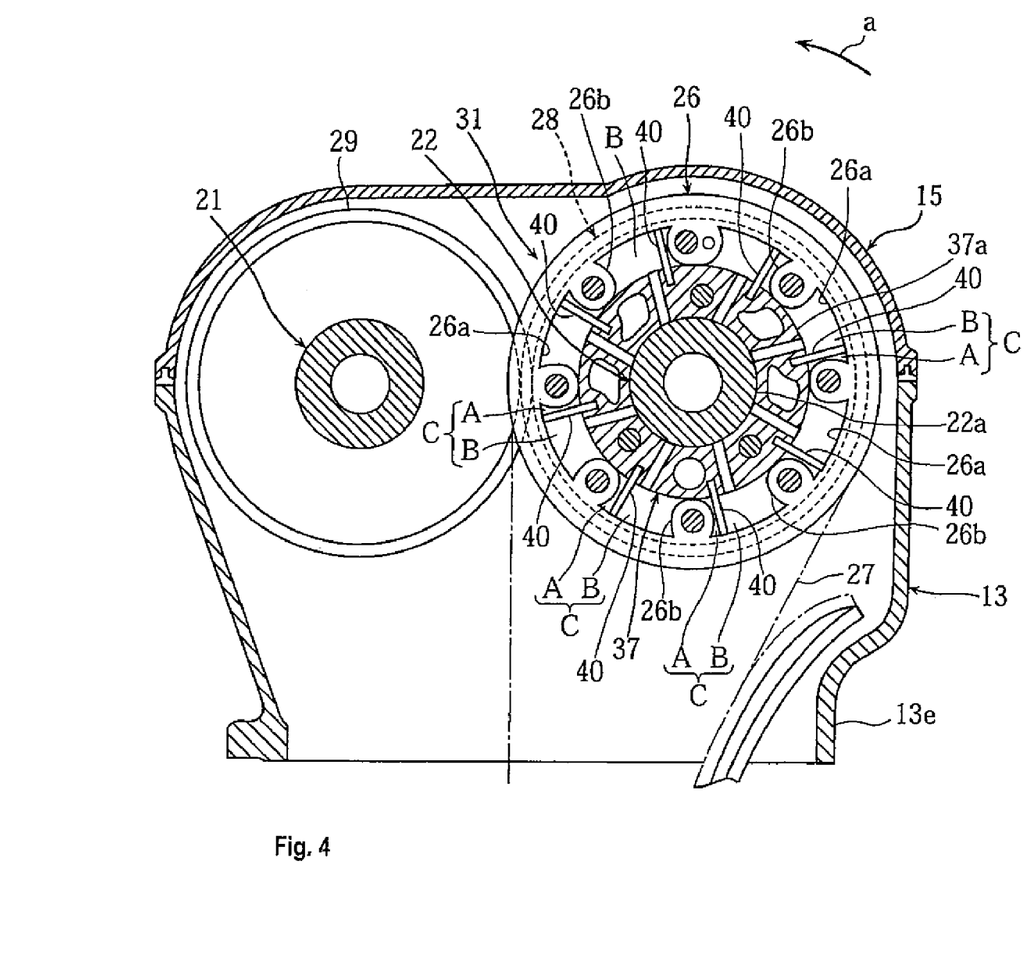
FIG. 4 is a side cross-sectional view of a valve timing variable mechanism of the engine.
Figure 5:
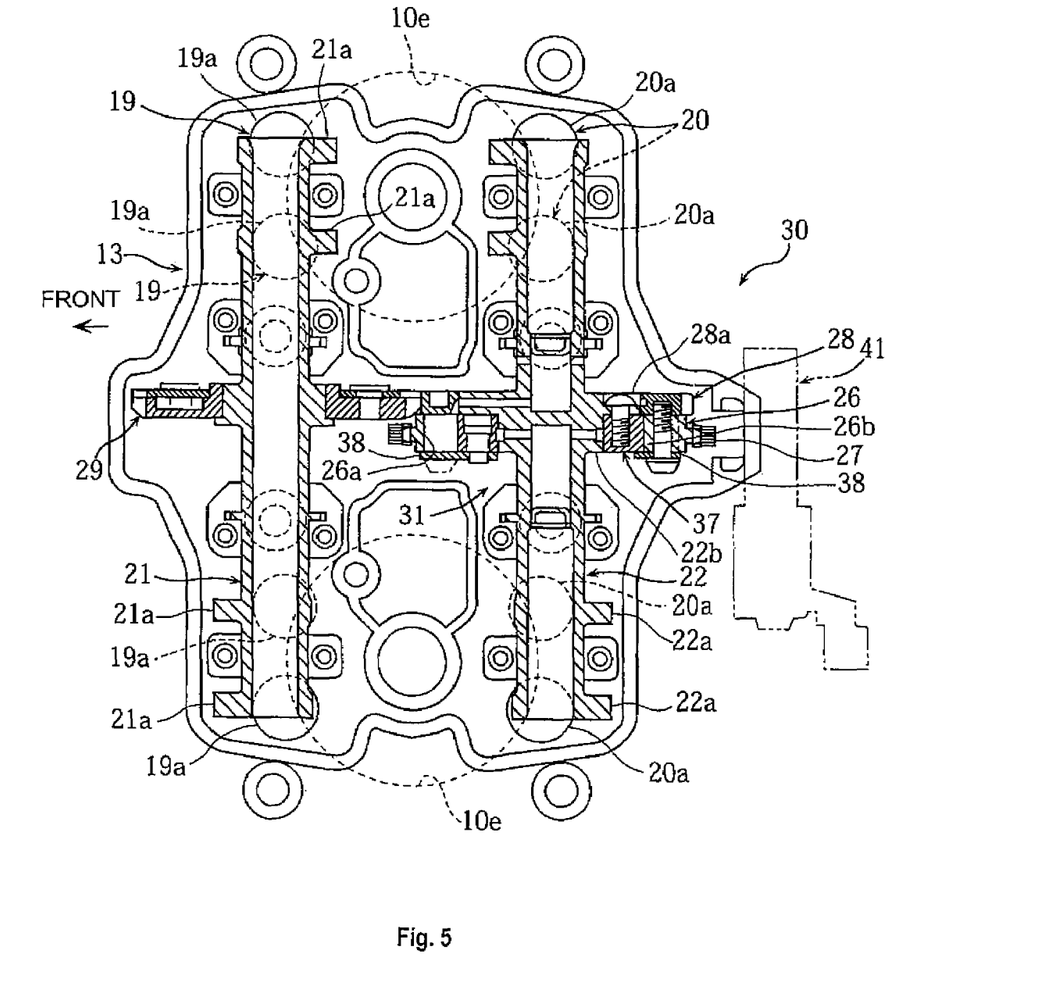
FIG. 5 is a plan cross-sectional view of exhaust and intake cam shafts of the engine.

Spaces surrounded by concaves 26a of cam sprocket 26, outer circumferential surface 37a of inner rotor 37, intake side timing gear 28, and cover plate 38 correspond to hydraulic chambers C (see FIG. 4). Vanes 40 are provided on the outer circumferential surface of inner rotor 37. Vanes 40 are disposed within hydraulic chambers C, and are urged toward the outside in the radial direction to slidingly contact the inner circumferential surface of the corresponding concave 26a of cam sprocket 26. Vanes 40 section each hydraulic chamber C into a spark advance side hydraulic chamber A and a spark retardation side hydraulic chamber B.

When hydraulic pressure is supplied to spark advance side hydraulic chambers A, intake cam shaft 22 rotates relative to cam sprocket 26 and intake side timing gear 28 in a counterclockwise direction. As a result, the opening and closing timing of intake valve 20 shifts to the spark advance side.

Hydraulic switching valves 41 are disposed on outer sides of inner walls 13e and 14e of front and rear cylinders 13 and 14. Hydraulic switching valves 41 are disposed in parallel with the cam shaft 22 on the V bank side.

Figure 6:
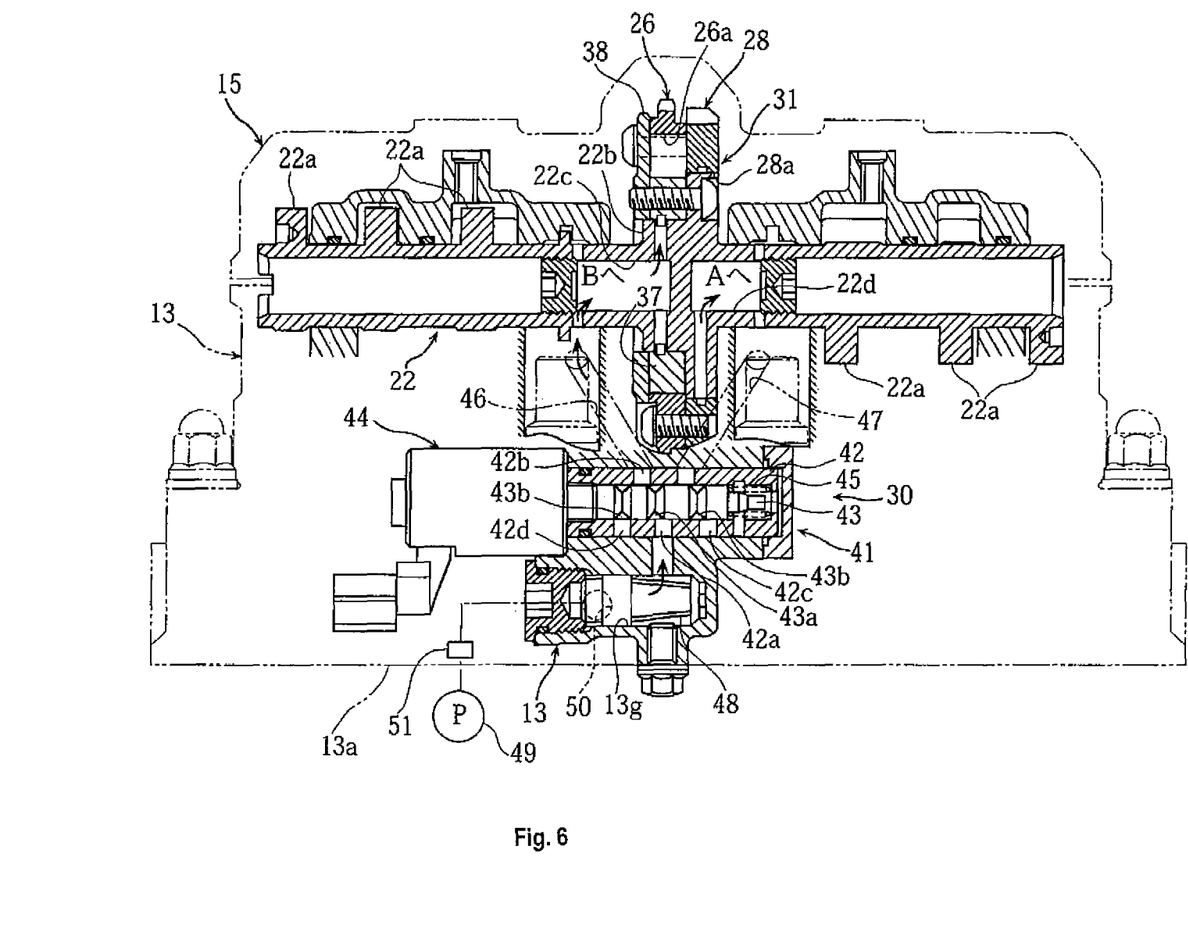
FIG. 6 is a front cross-sectional view of the valve timing variable mechanism.

As illustrated in FIG. 6, each hydraulic switching valve 41 has a cylinder 42, a valve body 43 inserted through cylinder 42 in such a manner as to advance and retreat in the axial direction, and a solenoid 44 disposed at one end of cylinder 42 to advance and retreat valve body 43. Valve body 43 is urged toward a retreat position by a return spring 45. An introduction concave 43a is formed at the axial center of the outer circumferential surface of valve body 43. Drain concaves 43b, 43b are formed on both sides of introduction concave 43a in the axial direction.

Cylinder 42 has an introduction hole 42a, a spark retardation side outlet 42b, a spark advance side outlet 42c, and drain holes 42d, 42d. Spark retardation side outlet 42b communicates with spark retardation side hydraulic chambers B via a spark retardation side hydraulic path 46 and a spark retardation side cam shaft path 22c provided within intake cam shaft 22. Similarly, spark advance side outlet 42c communicates with spark advance side hydraulic chambers A via a spark advance side hydraulic path 47 and a spark advance side cam shaft path 22d.

Cylinder head 13 has an oil filter chamber 13g communicating with introduction hole 42a of cylinder 42. Filter chamber 13g contains an oil filter 48. Oil filter chamber 13g is connected with an oil supply path 50. The upstream end of oil supply path 50 is connected to an oil pump 49 with a hydraulic control valve 51 interposed therebetween.

When engine revolution speed is equal to or lower than a predetermined revolution speed, opening and closing timing of intake valve 20 is in the spark retardation condition shown in FIG. 6. In this condition, valve body 43 of hydraulic switching valve 41 is shifted to the rear end position where introduction concave 43a communicates with spark retardation side outlet 42b. Thus, hydraulic pressure is supplied to spark retardation side hydraulic chambers B. In valve timing variable mechanism 31, the opening of spark retardation side hydraulic chambers B are maximized, and intake cam shaft 22 is rotated in the clockwise direction relative to cam sprocket 26. Accordingly, the opening and closing timing of intake valve 20 comes into the spark retardation condition (curve indicated by a broken line in FIG. 10).

Figure 10:
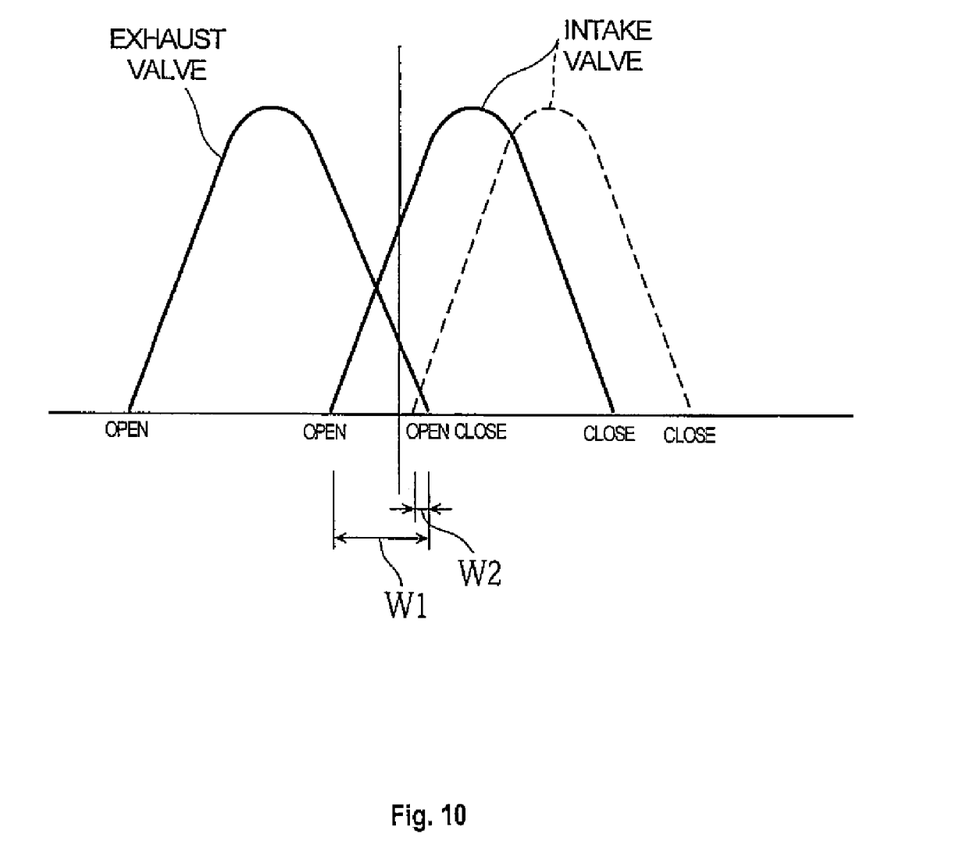
FIG. 10 is a diagram showing characteristics of the valve timing controller.

When engine revolution speed exceeds the predetermined revolution speed, valve body 43 is shifted toward the spark advance side by solenoid 44. Then, introduction concave 43a communicates with spark advance side outlet 42c, and hydraulic pressure is supplied to spark advance side hydraulic chambers A. As a result, spark advance side hydraulic chambers A expand, and intake cam shaft 22 relatively rotates in the anticlockwise direction, that is, in the direction indicated by arrow 'a' as the rotation direction of intake cam shaft 22. Accordingly, the opening and closing timing of intake valve 20 comes into the spark advance condition (curve indicated by a solid line in FIG. 10). As shown in FIG. 10, an overlapping amount w1 of the exhaust and intake valves in the spark advance condition is larger than an overlapping amount w2 in the spark retardation condition. Oil in spark retardation side hydraulic chambers B flows in the direction opposite to the direction at the time of hydraulic pressure supply, and is collected after passing through drain concaves 43b and drain holes 42d.

ECU 33 controls valve timing variable mechanism 31 such that the phase of intake cam shaft 22 after the control start condition acquisition corresponds to control target value A based on detection values obtained from shift sensor 32 for detecting the shift position, a crank sensor 55 for detecting the crank shaft angle, a cam sensor 56 for detecting the phase angle of intake cam shaft 22, a throttle sensor 57 for detecting the openings of throttle valves 23a and 23b, and an intake pressure sensor 58 for detecting intake pressure.

Figure 8:
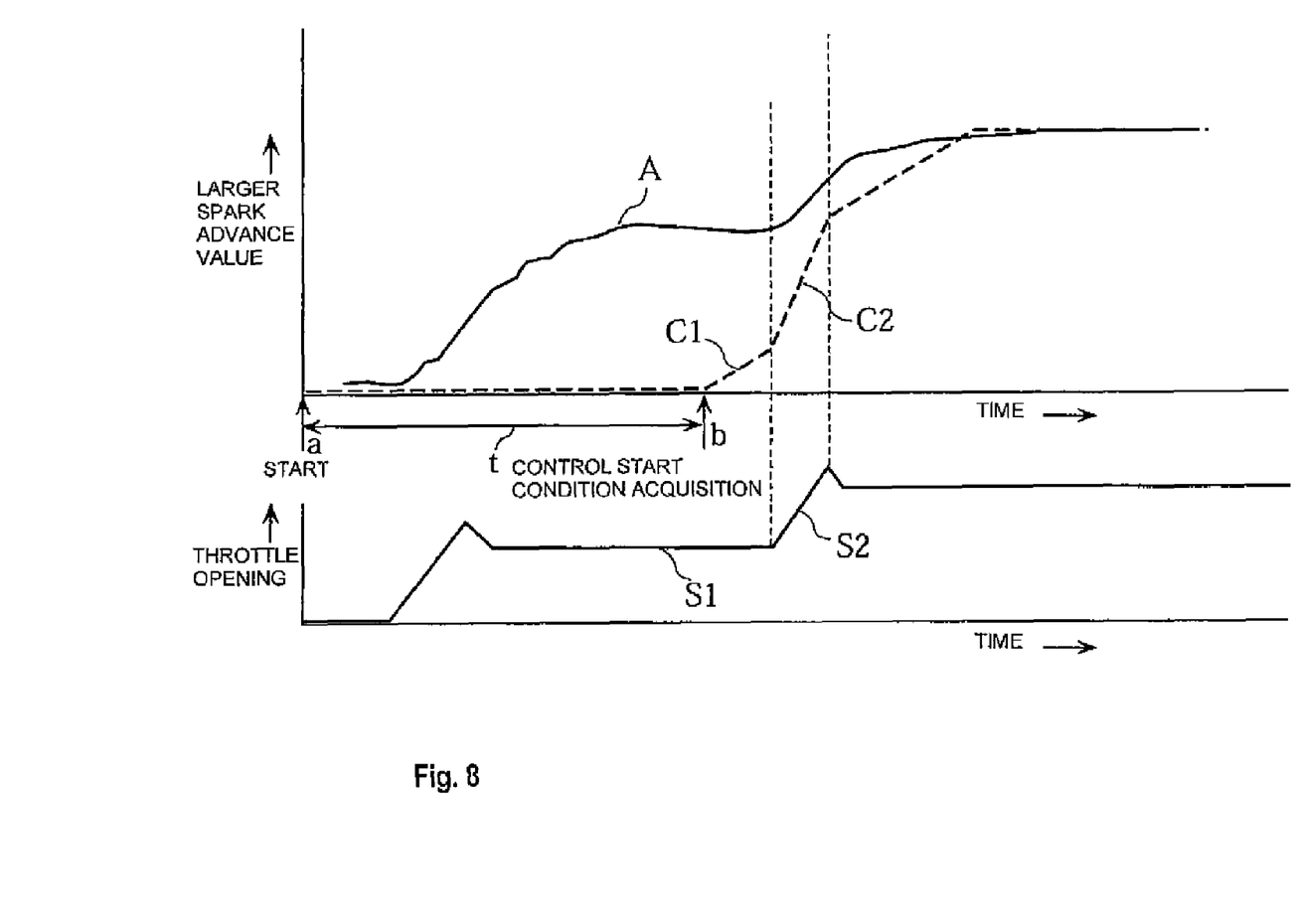
FIG. 8 is a diagram showing characteristics of the valve timing controller.

In controlling valve timing variable mechanism 31, the period from engine start time 'a' to control start condition acquisition time 'b' corresponds to stand-by time 't' as shown in FIG. 8. Stand-by time t is the time required to obtain an engine operation condition sufficient for performing valve timing variable control. Thus, valve timing variable control is not performed during stand-by time t.

ECU 33 includes driver's desire judging means 33c that judges whether the rider desires to increase the output, as discussed above. More specifically, ECU 33 calculates the throttle opening speed (quantity of throttle opening increase per unit time) based on the opening of the throttle valve obtained from throttle sensor 57. ECU 33 judges that the rider does not desire an output increase when the throttle opening speed is equal to or lower than a predetermined value. ECU 33 judges that the rider desires an output increase when the throttle opening speed exceeds the predetermined value. Alternatively, ECU 33 may judge that the rider desires an output increase when the opening of the throttle valve becomes equal to or larger than a predetermined value.

When the throttle opening speed is equal to or lower than a predetermined value s1 such as zero, that is, when the throttle valve opening does not change after control start condition acquisition time b, the phase of intake cam shaft 22 shifts toward control target value A at a reference update speed C1. When the throttle opening speed is equal to or higher than a predetermined value s2 after control start condition acquisition time b, the phase of intake cam shaft 22 shifts toward control target value A at a transient update speed C2 higher than reference update speed C1. More specifically, transient update speed C2 increases as the throttle opening speed rises.

Figure 9:
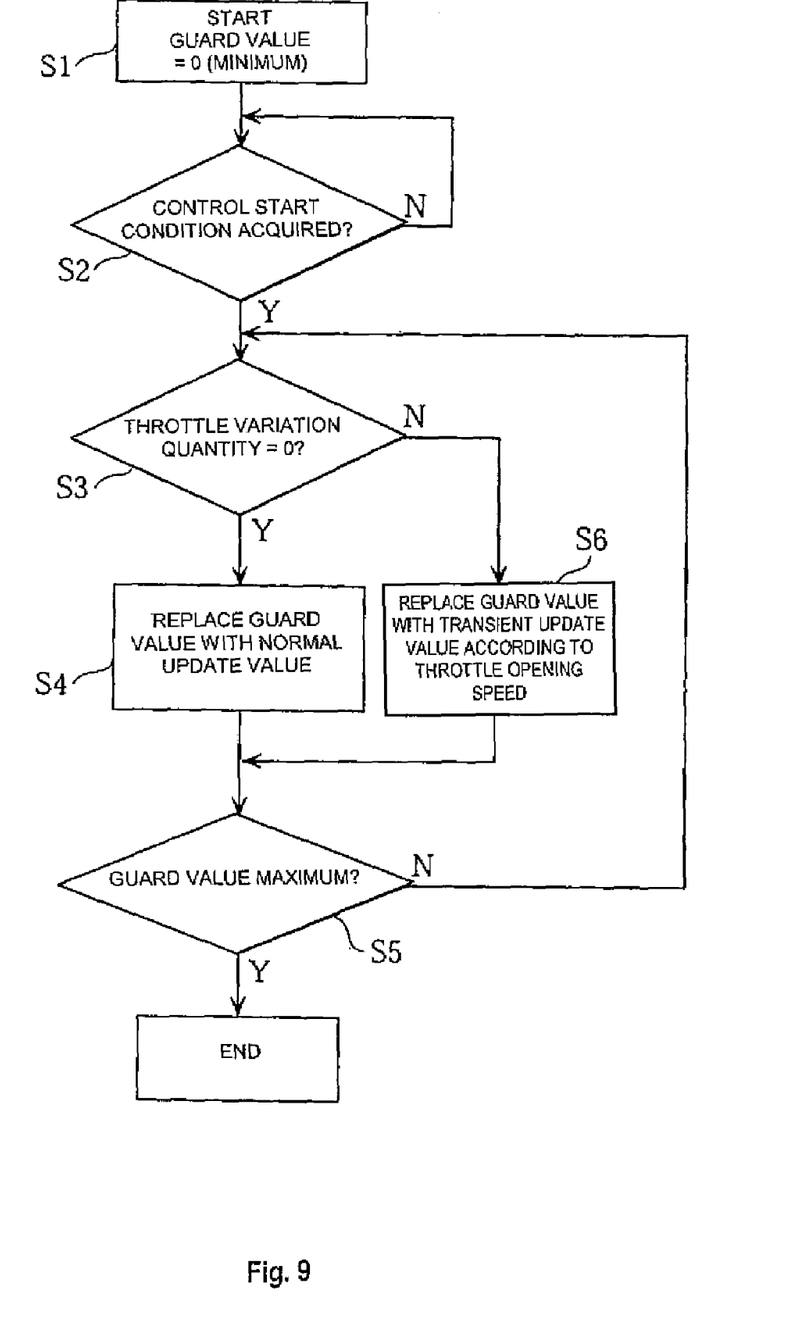
FIG. 9 is a flowchart of operation of the valve timing controller.

Operation of ECU 33 is discussed with reference to FIG. 9. When the engine starts, the spark advance value (guard value) is set to zero. Then, it is judged whether the control start condition has been acquired, that is, whether stand-by time t has elapsed. When the control start condition has been acquired, the variation quantity of the throttle opening is read out (steps S1-S3). When the variation quantity of the throttle opening, that is, the throttle opening speed, is zero, it is determined that the rider does not desire an output increase. The guard value is then replaced with a normal update value, and the phase of the intake cam shaft shifts toward the control target value at the reference update speed. When the guard value reaches the maximum value (target value), the control ends based on the judgment that the phase of the intake cam shaft has reached the control target value (steps S4 and S5).

When the variation quantity of the throttle opening speed is determined not to be zero in step S3, it is judged that the rider desires an output increase. The guard value is then replaced with a transient update value corresponding to the throttle variation quantity, and the phase of the intake cam shaft shifts toward the control target value at a transient update speed higher than the reference update speed (step S6).

According to this embodiment, the phase of intake cam shaft 22 shifts toward control target value A at reference update speed C1 when the rider does not desire an output increase. Thus, the variation quantity of the spark advance value per unit time after control start condition acquisition time b is decreased, and adverse effects on drivability such as a feeling of jumping out of the vehicle are reduced.

When it is judged that the rider desires an output increase based on an increase in the throttle operation amount, the phase of intake cam shaft 22 shifts toward control target value A at transient update speed C2 which is higher than reference update speed C1 and established according to the throttle opening speed. Thus, the spark advance value greatly increases in a short time in accordance with the acceleration operation of the rider. Accordingly, a rapid increase in engine output corresponding to the rider's desire is achieved.

According to this embodiment, it is judged that the rider desires to increase the output when the throttle opening speed is not zero. Thus, the desire of the rider is judged by effectively utilizing throttle sensor 57.

According to this embodiment, it is judged that the rider desires an output increase when the throttle opening speed is not zero. In addition, the phase is shifted at a higher transient update speed as the throttle opening speed increases. However, the speed of phase shift may be switched between two levels of the reference update speed and the transient update speed based on the judgment that the rider does not desire output increase when the throttle opening speed is equal to or lower than a predetermined value and that the rider desires output increase when the throttle opening speed exceeds the predetermined value.

While the driver's desire judging means makes judgment based on the throttle opening speed in this embodiment, this driver's desire judging means according to the invention may judge that the rider desires output increase at the time of shift down of the transmission.

The particular embodiments of the invention described in this document should be considered illustrative, rather than restrictive. Modification to the described embodiments may be made without departing from the spirit of the invention as defined by the following claims.

The invention claimed is:

1. A valve timing controller of an engine, comprising:
   an intake valve;
   an exhaust valve;
   an intake cam shaft that opens and closes the intake valve;
   an exhaust cam shaft that opens and closes the exhaust valve;
   a valve timing variable mechanism that varies phases of the intake cam shaft and the exhaust cam shaft;
   a control target value setting unit that sets a control target value for the valve timing variable mechanism according to an engine operation condition;
   a variable mechanism control unit that controls the valve timing variable mechanism such that the phases of the intake cam shaft and the exhaust cam shaft shift toward the control target value after a control start condition is acquired;
   a driver's desire judging means that judges whether a rider desires an output increase; and
   a throttle opening speed detecting means, wherein
   the variable mechanism control unit shifts the phases of the intake cam shaft and the exhaust cam shaft toward the control target value at a reference update speed when the driver's desire judging means judges that the rider does not desire an output increase when a throttle opening speed detected by the throttle opening speed detecting means is less than a predetermined value, wherein the predetermined value is greater than zero, and
   the variable mechanism control unit shifts the phases of the intake cam shaft and the exhaust cam shaft toward the control target value at a transient update speed higher than the reference update speed when the driver's desire judging means judges that the rider desires an output increase when the throttle opening speed detected by throttle opening speed detecting means is equal to or higher than the predetermined value and when an acceleration of the throttle opening speed is zero.

2. A valve timing controller comprising:
   an intake valve;
   an exhaust valve;
   an intake cam shaft that opens and closes the intake valve;
   an exhaust cam shaft that opens and closes the exhaust valve;
   a valve timing variable mechanism that varies phases of the intake cam shaft and the exhaust cam shaft;
   a control target value setting unit that sets a control target value for the valve timing variable mechanism according to an engine operation condition;
   a variable mechanism control unit that controls the valve timing variable mechanism such that the phases of the intake cam shaft and the exhaust cam shaft shift toward the control target value after a control start condition is acquired; P1 a driver's desire judging means that judges whether a rider desires an output increase;
   a transmission; and
   a shift position detecting means that detects a shift position of the transmission, wherein
   the driver's desire judging means judges that the rider desires an output increase when the shift position detecting means detects that the shift position of the transmission has been switched to shift down position,
   the variable mechanism control unit shifts the phases of the intake cam shaft and the exhaust cam shaft toward the control target value at a reference update speed when the driver's desire judging means judges that the rider does not desire an output increase, and
   the variable mechanism control unit shifts the phases of the intake cam shaft and the exhaust cam shaft toward the control target value at a transient update speed higher than the reference update speed when the driver's desire judging means judges that the rider desires an output increase.

* * * * *